| United States Patent [19] | [11] Patent Number: 4,544,692 |
| Kuziemka | [45] Date of Patent: Oct. 1, 1985 |

[54] POLYSILOXANE AND FLUOROCARBON COATING COMPOSITION

[75] Inventor: Edmund J. Kuziemka, Naperville, Ill.

[73] Assignee: Material Sciences Corporation, Mount Prospect, Ill.

[21] Appl. No.: 527,244

[22] Filed: Aug. 29, 1983

[51] Int. Cl.$^4$ .................. C08L 63/02; C08L 27/08
[52] U.S. Cl. .................... 524/361; 524/376; 525/101; 525/104; 525/109; 525/110; 525/476; 525/930
[58] Field of Search ............... 525/101, 104; 524/361, 524/376

[56] References Cited

U.S. PATENT DOCUMENTS

| 3,786,015 | 1/1974 | Merrill et al. | 524/588 |
| 3,816,364 | 6/1974 | Bayer | 523/427 |
| 3,843,577 | 10/1974 | Keil | 523/425 |
| 3,925,276 | 12/1975 | Merrill | 524/588 |
| 4,028,339 | 6/1977 | Merrill | 427/230 |
| 4,121,000 | 10/1978 | Wald | 524/267 |
| 4,262,043 | 4/1981 | Wald | 427/387 |
| 4,369,268 | 1/1983 | Graziano et al. | 523/435 |
| 4,369,279 | 1/1983 | Emerick | 524/267 |

*Primary Examiner*—Wilbert J. Briggs, Sr.
*Attorney, Agent, or Firm*—Emrich & Dithmar

[57] ABSTRACT

Fast curing resin coating compositions for coating metal surfaces and a one-step method are described. The coatings comprise a high molecular weight epoxy resin, although a portion thereof may be low molecular weight, an effective amount of a cross-linking agent for the epoxy resin, a polysiloxane resin system, an effective amount of a curing agent for the polysiloxane fluid system, a fluorocarbon polymer, and the balance being suitable solvents. The coatings are applied in one-step and dry in less than one minute and may be formed into various shapes and forms useful for stovetop cookware.

19 Claims, No Drawings

POLYSILOXANE AND FLUOROCARBON COATING COMPOSITION

BACKGROUND OF THE INVENTION

Silicone resin compositions have been described which are particularly applicable to baking utensils for release coatings. See for example, the Merrill et al. U.S. Pat. Nos. 3,786,015, 3,925,276 and 4,028,339. These patents describe silanol-containing silicone resin compositions which are particularly applicable as release agents for cooking and baking utensils. Such coating compositions, however, require extensive heat curing at relatively high temperatures for an extended period of time after application to a metal surface. For example, U.S. Pat. No. 4,028,339 (col.5) describes the curing of a silanol-containing silicone resin composition at 425° F. for 45 minutes after application to tin-coated steel surfaces. Moreover, such silicone compositions are not particularly flexible and cannot be applied to metal sheets which are thereafter drawn and shaped into cooking utensils such as cups, pans and the like.

U.S. Pat. No. 4,369,268 issued to Graziano et al. on Jan. 18, 1983 for Organopolysiloxane Coating Compositions described a coating composition that solved most of the problems discussed above. The coating was flexible when sprayed onto a metal sheet and could be drawn and shaped into baking utensils such as cups, pans and the like. However, the coating composition of the Graziano et al. patent required a two-step process and was intended for bakeware rather than cookware. Bakeware is generally exposed to lower temperatures than stove top cookware and to a less hostile food environment, also. Cookware is often exposed to highly acidic foods, such as tomatoes or combinations such as salt and onion which are harsh on coatings.

It is an object of this invention to provide silicone and fluorocarbon coating compositions which cure rapidly on the surfaces of metal objects and utensils with little or no post heating required. It is a further object of this invention to provide silicone and fluorocarbon coating compositions which are flexible at ambient temperature and can be applied to metal surfaces and thereafter be formed and shaped into various cooking utensils and similar objects without the resin coating cracking or chipping from the metal surface. It is a further object to provide silicone and fluorocarbon coating compositions which can be applied to metal sheets in one step and after drawing or forming are suitable for stovetop cookware. These and other objects are apparent from and are achieved in accordance with the following disclosure.

SUMMARY OF THE INVENTION

Silicone and fluorocarbon coating compositions including an epoxy resin system in a suitable solvent, a silanol-containing silicone releasing agent, a silicone fluid, a curing catalyst, and a fluorocarbon resin provide coatings that can be applied to a metal substrate in one step, rapidly cure in a very short time-temperature cycle and retain the drawing characteristics heretofore found desirable. These combination resin formulations can be readily applied to metal surfaces to form thin, flexible films which provide excellent release properties for stovetop cookware.

The combination resin coating of the present invention, which can be applied directly to any metal surface such as steel, tin mill black plate, tin-free steel, aluminum and the like, comprises an epoxy resin having a molecular weight measured by gel permeation chromatography in the range of from about 300 to about 200,000, with not less than about 85% of the epoxy resin by weight having a molecular weight in the range of from about 50,000 to about 200,000, dissolved in a high boiling solvent such as Cellosolve ester or a high boiling ketone such as isophorone, a combination of silicones comprising a silanol-containing organopolysiloxane resin or a polysiloxane of the type disclosed in the Emerick U.S. Pat. No. 4,369,279 issued Jan. 18, 1983, the disclosure of which is incorporated herein by reference, and an alkylphenyl siloxane fluid. Alternate silicones and combinations thereof are described in U.S. Pat. Nos. 3,786,015 and 4,028,339, the disclosure of each of which is incorporated herein by reference.

While the combination of silicone resins and fluorocarbon resins are known to be release agents for food products, the formulations thereof described in the cited prior patents have certain disadvantages. The prior art coatings must be cured at relatively high temperatures for rather long periods, and the cured coatings are relatively inflexible so that coated metal strips cannot be drawn or bent without cracking or destroying the coatings. In contrast thereto, the formulations described herein can cure rapidly at lower temperatures and the resulting coatings, applied to metal sheets in one step, can be bent, drawn and pressed into desired shapes without the coating cracking or being deformed. These silicone-fluorocarbon formulations have obvious advantages over those of the prior art.

Because the silicone constituents are expensive, an important feature of the subject invention is the combination thereof with the fluorocarbon resin which enables a much smaller quantity of silicone resin to be used while maintaining the forming and food release characteristics and simultaneously improving the coating integrity when exposed to acidic and harsh foods.

DESCRIPTION OF THE PREFERRED EMBODIMENT

This invention is a coating composition for metal surfaces which comprises a combination of constituents, as follows:

(A) A high molecular weight epoxy resin, preferably a bisphenol A-epichlorohydrin resin, although equivalent epoxy resins are also suitable. The solids content of this resin constitutes about 10% to about 20% of the total weight of the composition, and has a molecular weight in the range of from about 50,000 to about 200,000 measured by gel permeation chromatography.

(B) A portion of the epoxy resin may be a low molecular weight resin having a molecular weight in the range of from about 300 to about 500; however, no more than about 15% by weight of the solids content of the epoxy may be in the low molecular weight range.

(C) A suitable cross-linking agent for the epoxy resin present in the range of from about 2% by weight to about 25% by weight of the solids content of the epoxy resin. Various well known cross linking agents may be used such as a melamine-formaldehyde resin or an etherified resol-phenolic resin including urea formaldehyde.

(D) A silicone fluid which may be a dimethylpolysiloxane fluid having a viscosity of 50 to 5,000 centistokes measured at 25° C. or a mixture of phenylsiloxanes, dimethylsiloxanes and diphenyldimethylsiloxanes.

(E) A polysiloxane resin-forming precondensate which has one or more of the units

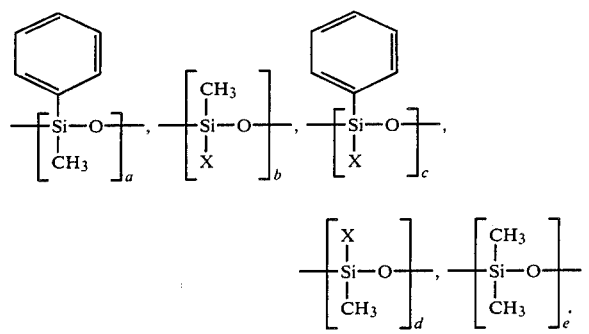

wherein X is a functional group which allows cross linking at its site, and a, b, c, d and e are of a magnitude and in proportions which provide the resin with a degree of substitution, measured as the ratio of phenyl plus methyl groups to silicon atoms, of at least about 1.0, and a ratio of phenyl groups to silicon atoms of at least about 0.3, and which has a silanol content above 4%, by weight of the precondensate; or an organopolysiloxane release resin of the type set forth in the aforementioned Merrill U.S. Pat. No. 4,028,339. The combination of (D) and (E) is the polysiloxane resin system and the solids content of the resin system and should be present in the range of from about 2% to about 7% by weight of the composition.

(F) A suitable catalyst for curing the polysiloxane resin system which may be a multifunctional amine catalyst or a tin, zinc or iron salt of an organic acid such as an octoate or naphthenate or dibutyltin dilaurate. These catalysts may be present in an amount of about 1% by weight of the total polysiloxane resin system, although the catalyst may be within the range of from about 0.5% to about 2% by weight of the polysiloxane resin system.

(G) Suitable solvents for the constituents of the final composition, including both high and low boiling point solvents.

The coating composition can comprise the several components described above and can be applied directly in a one-step process to metal surfaces, preferably surfaces which have been treated to remove oil, grease and the like, such as with Bondrite 702, a product of the Parker Manufacturing Company or with a product such as chromium phosphate. The curing times for the subject compositions are on the order of 45 to 60 seconds at a peak metal temperature in the range of between about 450° to about 480° F. It will be appreciated that the type and thickness of the metal substrate will affect the preheat temperature and duration since it is the metal temperature which is important in curing the compositions of the subject invention.

Preferably, the coating composition of the present invention is laid onto the metal substrate to provide a dry thickness not less than about 0.4 mils and not greater than about 1.2 mils, depending on the type of cookware involved. If the coating is less than 0.4 mils thick, the coating is stretched too thin and may blister during cooking, the preferred minimum thickness being 0.7 mils. Additionally, the coating can lose its adhesion from being subjected to detergents and acidic foods. On the other hand, coatings greater than 1.2 mils thick do not perform as well during drawing from the sheet to the finished product as do the proper thickness coatings, and because the coatings are expensive, excessive thicknesses are wasteful.

Where a pigment is desirable, it may be mixed in paste or powder form with a small portion of the epoxy resin, allowed to stand 2–3 hours to be wet by the resin and thereafter mixed with the remainder of the constituents forming the coatings.

The following Example sets forth a coating composition of the invention.

EXAMPLE

A flexible fluorocarbon-silicone stovetop coating of wide applicability is produced in accordance with the following formula:

|  | Wt. in Lbs. |
|---|---|
| High molecular weight bisphenol A-epichlorohydrin resin (min. mol. wt.) 50,000 measured by gel permeation chromatography; hydroxyl no. 0.35; 32% solids in cellosolve ester (Eponol 53L32) (Shell) | 30 |
| Reynolds' LS-B-56 (aluminum flake pigment) | 25 |
| Eponol 53L32 (Shell) | 460 |
| Isophorone | 40 |
| Butyl Cellosolve (Union Carbide) | 40 |
| Melamine resin Cymel 327 (American Cyanamid) | 27 |
| Polysiloxane as set forth in U.S. Pat. No. 4,028,339 or U.S. Pat. No. 4,369,279 | 87 |
| Silicone fluid, such as a dimethylpolysiloxane fluid having a viscosity of 50–5,000 centistokes measured at 25° C. or a mixture of methylphenylsiloxane, dimethylsiloxanes and diphenylmethylsiloxanes (GE SR 496) or (Dow Chemical Q1-9770) | 5 |
| 8% Zinc naphthenate (Tenneco) | 8 |
| 6% Iron naphthenate (Tenneco) | 3 |
| Polytetrafluoroethylene (Shamrock Chemical Company-SST-3) | 80 |
| Modaflo an acrylic copolymer produced by Monsanto | 8 |
| SC100 an aromatic hydrocarbon diluent produced by Exxon, Shell, Ashland Boiling range 310–350° F. | 76 |
|  | 913 |

With respect to the epoxy resin used herein, use of 100% of the high molecular epoxy resin provides a satisfactory coating composition. To some extent, the low molecular weight epoxy resin hereinbefore specified may be mixed with the high molecular weight epoxy resin to provide satisfactory coating compositions of this invention; however, no more than 15% by weight of the epoxy solids can be the low molecular weight resin since excessive amounts of low molecular weight resin results in tacky coatings which do not cure well and are not resistant to detergents or acidic foods.

Of the various solvents included in the example hereinbefore set forth, isophorone is a true solvent for the entire system and is the highest boiling point solvent present, whereby it is the last solvent to boil out. Butyl cellosolve is a true solvent for all resins contained in the composition, but unlike isophorone is a medium boiling point solvent and comes out prior to isophorone. Diethylene glycol or various other glycols such as monobutyl, monoethyl or monopropyl may be substituted for butyl cellosolve. The butanol retards changes in viscosity and is a low boiling point diluent providing stability. The use of a lower molecular weight alcohol, as compared to butanol, is inappropriate in the subject composition since it boils off or evaporates too fast causing blistering of the coating. Acceptable substitutes for the butanol to function as viscosity modifiers are high molecular weight alcohols such as isobutanol or octanol. The Modaflo serves to modify the surface tension of the composition whereas the SC 100 produced by Exxon Corporation or Shell Chemical Company is an aromatic diluent containing approximately 2% paraffins and 98% $C_8$ aromatics.

The constituents of the Example are set forth in the preferred concentrations, it will be appreciated however that each constituent may be present in a range of concentrations while still producing an improved coating which attains all the purposes and objects of the invention. For instance, the high molecular weight epoxy resin or the combination of high and low molecular weights epoxy resin may be present with respect to the solids content of the resin in the range of from about 10% to about 20% by weight of the composition. Since the epoxy resins may have a solids content of about 30%, the range on a total weight basis may be from about 30% to about 60%.

The melamine resin is a cross-linking resin to cure the epoxy resin, as is well known in the art. Any art recognized resin may be present in the range of from about 2% to about 25% by weight of the solids content of the epoxy resin. The various solvents such as isophorone, butyl cellosolve, the surface tension modifier and the aromatic diluent may be added in a relatively wider ranges of concentrations and one may be substituted for another, as is well within the skill of the art.

The silicone resin system which includes a combination of the silicone fluid additive and the polysiloxane material should be present, with respect to the solids content of the silicone resin system, in the range of from about 2% to about 7% by weight of the composition. Usually, these silicone resins are provided by the manufacturer in solutions with about 50% solids.

Although zinc and iron naphthenate are illustrated as catalysts for the silicone resin system in the Example, other catalysts are appropriate to polymerize the polysiloxane resin system such as the aforementioned multifunctional amine catalyst, as well as tin octoate or naphthenate.

The polytetrafluoroethylene, when properly fused, gives food release properties as well as heat resistance. The amount in the formula is optimum; however, the fluorocarbon polymer resin may be present, with respect to the solids content of the fluorocarbon polymer resin, in the range of from about 4% by weight to about 15% by weight of the composition. If less than about 4% by weight of a fluorocarbon polymer resin is used, the resulting coating will not give as good food release properties and will not be sufficiently heat resistant to obtain the superior results of this coating compared to the prior art coatings. Using the fluorocarbon polymer resin above about 15% by weight imparts trixopropy or puffiness which detracts from the benefits of a one step coating.

The one step method of the present invention entails applying the coating by coil coating; however, if the coating is to be applied by spray, it is possible to increase the fluorocarbon resin by as much as about 50% of its specified weight and reducing the viscosity with appropriate solvent for spray application. Various copolymers of polytetrafluoroethylene are also suitable for use in this invention, for instance a copolymer of tetrafluoroethylene and hexafluoropropylene disclosed in the aforementioned Emerick patent is also suitable.

Pigments useful in the present invention may be of a wide variety and are available from Reynolds Metals Company, Alcoa, Silberline and Metals Disintegrating Company and usually are in the form of paste or powder. It is necessary when contemplating the production of cookware that the pigments be FDA approved. The pigment is used simply for aesthetic reasons and none of the superior food release or fabrication properties are imparted by the use of pigments.

Various epoxy resins may be used to provide the specified molecular weights in the range of from about 300 to about 200,000. For instance, the Plastics and Resins Division of Shell Chemical Company provides an epoxy resin identified as EPONOL 53-B-40 which has an average molecular weight of 80,000 as measured by gel permeation chromatography. Shell Chemical Company also provides an EPONOL 55 epoxy resin with an approximate molecular weight of 200,000. Shell Chemical Company also provides an EPON No. 828 resin which has an average molecular weight of approximately 380. Accordingly, these resins are entirely satisfactory to provide the aforementioned molecular weight range of from about 300 to about 200,000, as measured by gel permeation chromatography. Other manufacturers include Ciba-Geigy Corporation, General Mills, Inc. and Celanese Corporation.

Various curing agents for the epoxy resins are well known in the art and include as aforesaid, various melamine-formaldehyde resins, urea formaldehyde, phenol-formaldehyde (resol-type) which are produced by American Cyanamid Company, Monsanto Company and Reichhold Chemicals, Inc. For instance, Ciba Products Company, a division of Ciba-Geigy Corporation produces a phenolic resin under the trade designation ARALDITE ® D P-139 which is an etherified resol-type phenolic resin used as a curing agent for coatings.

The polysiloxane fluid system includes the polysiloxanes of the type disclosed in the aforementioned Merrill '339 patent as well as the aforementioned Emerick '279 patent. General Electric Company produces silicone resin systems under the trade designation SR474 and SR496 specifically directed to the baking art, and the Emerick patent specifies a Dow Chemical Company polysiloxane resin DC6-2230 in combination with a silicone fluid which is a dimethylpolysiloxane fluid having a viscosity of 50 to 5,000 centistokes measured at 25° C. Additionally, Mallinckrodt, Inc. also provides a silicone resin system suitable under the trade designation Byk-300.

Dow Chemical Company produces a silicone fluid under the trade designation Q1-9770 similar to the silicone fluid specified in the Emerick patent which is a reactive fluid that enhances the release properties of the final formulation coatings based on polysiloxane resins; the optimum level of this additive has to be established for each application and for each polysiloxane resin used therewith.

The catalysts for the polysiloxane system used in the subject invention are available from Tenneco Chemicals, Inc., Mooney Chemical and Troy Chemical. These include the naphthenates, octoates and the polyfunctional amines. The preferred catalysts are the zinc, iron, and tin salts of an organic acid, such as naphthenates and the octoates.

The various solvents used in the subject invention are well known and available from many sources; however, the surface tension and viscosity modifier preferred is that sold by Monsanto Company under the trade designation MODAFLO and is a viscous light amber liquid with a color, ASTM of 0.5, a viscosity, S.U.S. at 210° F. of 5,000, a specific gravity, 60/60° F. of 0.99, a refractive index at 25° C. (40% in 2,2,4 triethyl pentane, of 1.4130–1.4190 and is soluble in benzene, toluene, zylene, kerosene, petroleum ether, carbontetrachloride, and mineral oil. This material is a complex polymeric viscous liquid and contains no silicone. Modaflo has been included by the Food and Drug Administration in the list of food additives for use in resinous and polymeric coatings and for use in paper and paperboard in contact with aqueous and fatty foods. Modaflo or its equivalent is used to lower the surface tension to prevent foaming which causes surface defects. The composition as applied has a viscosity in the range of from about 80 seconds, #4 Ford cup to about 160 seconds, #4 Ford cup at 25° C. The preferred viscosity range is from about 115 seconds to about 125 seconds, #4 Ford cup at 25° C.

The SC100 is an aromatic diluent and contains approximately 2% paraffins and 98% $C_8$ aromatics. Alternate hydrocarbon solvents suitable for the composition are aromatic 150. These solvents are added to lower cost and/or improve flow by minimizing blistering.

The coating of the subject invention not only provides better draw characteristics than heretofore available, taking draws up to 5" in depth, but also provides a coating with better adhesion. The subject coating has taken the entire Mirro cycle which is an accelerated test to determine the non-stick characteristics for finished cookware. Prior art coatings which have successfully taken the entire cycle are applied in two or three steps, but the subject coatings are applied in a single step, yet perform in an equal or superior manner than other available coatings, and are superior to general bakeware coatings which do not withstand exposure to acidic and harsh foods.

The Mirro test includes:
1. Frying a "greaseless" egg in a 10" new, washed unconditioned pan. Repeat with Teflon II or Silverstone-coated pan of comparable gauge. Compare release and cleanability of egg.
2. Condition the pan by wiping the surface with a solid shortening. Repeat the egg test, and compare.

Adapted DuPont Accelerated Cooking Test

| Materials | |
| --- | --- |
| Onions | use ½ c. chopped onions ¼ c. salt (each pan) |
| Ground Beef | spread 3½ lbs. evenly onto cookie sheet. Salt exposed side. Cut into 24 patties, wrap and freeze. |
| Tomato Sauce | 1 15 oz. can, 3 cans water, ¼ c. salt |
| Mix - Use two c. in each pan. | |
| Procedure | |
| 1. At beginning of test: | |
| A. Scrape across each pan 12 times with metal spatula. | |
| B. Scrape sides of each pan 12 times with metal spoon. | |
| Begin Cooking Tests | |
| Turn exhaust fan on high. | |

| | | -continued |
| --- | --- | --- |
| | | Rotate pans on burners after each test. |
| 2. | Onions | preheat pans 3 minutes on simmer. Place ½ c. onions and ¼ c. salt in pan. Simmer 5 minutes, stirring with metal spoon five times in each pan. Increase heat. |
| 3. | Meat | Move onions to side of pan with metal spoon and place 1 tbsp. solid shortening in center of pan. Place one meat patty in center of pan and cook 3 minutes. Reduce heat, cover and cook another 3 minutes. Turn patty over and cook with lid on another 4 minutes |
| 4. | Tomato Sauce | Turn off heat. Pour 2 c. sauce mixture in each pan on top of meat and onions. Using spoon, cut meat in quarters, then quarter in thirds. Stir mixture 10 times (scraping sides 5 times). Cover, boil slowly, 15 min. |
| 5. | Empty pans, wash and dry | |
| 6. | After approximately every 4 tests, fill each pan with 2 c. water and 1 tsp. detergent and bring to boil. Place a lid on the pan. Remove from heat. Soak until next working day. | |
| General Directions: | | |
| 1. | Evaluate pans and record tests on chart after each test. | |
| 2. | Do not test unless there is time to do one complete series at once. | |
| 3. | Reduce heat when necessary and try to keep heat as nearly alike under all pans. | |
| Evaluation: | | |
| 1. | At end of 25 cycle test, compare test pan with either Teflon II or Silverstone-coated pan of comparable gauge. This test accelerates staining, abrasion, bubbling or peeling of Teflon/Silverstone (if it occurs). | |
| 2. | Clean half of pan by boiling a solution of 3 tbsp dishwasher detergent in 1 c. water for 15 min. Empty, wash, rinse and dry. Repeat "greaseless" egg tests to evaluate release on both the cleaned and uncleaned half. Compare to Teflon II or Silverstone pans. | |

The coatings of the subject invention have successfully completed the entire Mirro cycle without failure, thereby proving them to be durable and suitable for stovetop cookware.

Although what has been described as considered to be the preferred embodiment of the present invention, it will be appreciated that various modifications and alterations may be made therein without departing from the true scope and spirit of the present invention which is to provide a coating for various sheet metal stock which may be drawn into various articles of manufacture without losing the food release and temperature resistant properties of the coating, and it is intended to cover within the claims appended hereto all such variations and modifications.

What is claimed is:

1. A fast curing resin coating composition consisting essentially of:
   an epoxy resin having a molecular weight measured by gel permeation chromatography in the range of from about 300 to about 200,000 present in the range of from about 10% by weight to about 20% by weight of said composition, not less than about 85% of said epoxy resin having a molecular weight in the range of from about 50,000 to about 200,000, an effective amount of a cross-linking agent for said epoxy resin, a polysiloxane resin system present in the range of from about 2% by weight to about 7% by weight of said composition, an effective amount of a curing agent for said polysiloxane resin system, a fluorocarbon polymer present in the range of from about 4% by weight to about 15% by weight of said composition, and the balance being suitable solvents.

2. The fast curing resin coating composition of claim 1, wherein up to 15% by weight of said epoxy resin has a molecular weight measured by gel permeation chromatography in the range of from about 300 to about 500.

3. The fast curing resin coating composition of claim 1, wherein said cross linking agent is a melamine resin.

4. The fast curing resin coating composition of claim 1, wherein said cross linking agent is an etherified resol-type phenolic resin.

5. The fast curing resin coating composition of claim 1, wherein said cross linking agent is a urea formaldehyde.

6. The fast curing resin coating composition of claim 1, wherein said cross linking agent is present in the range of from about 2% to about 25% by weight of the solids contents of said epoxy resin.

7. The fast curing resin coating composition of claim 1, wherein said cross linking agent is present in the range of from about 10% to about 12% by weight of the solids content of said epoxy resin.

8. The fast curing resin coating composition of claim 1, wherein said polysiloxane resin system includes a fluid composed of a mixture of methylphenylsiloxane, dimethylsiloxane and diphenyldimethylsiloxane.

9. The fast curing resin coating composition of claim 1, wherein said polysiloxane resin system includes organopolysiloxanes.

10. The fast curing resin coating composition of claim 1, wherein the polysiloxane resin system includes a precondensate which has one or more of the units

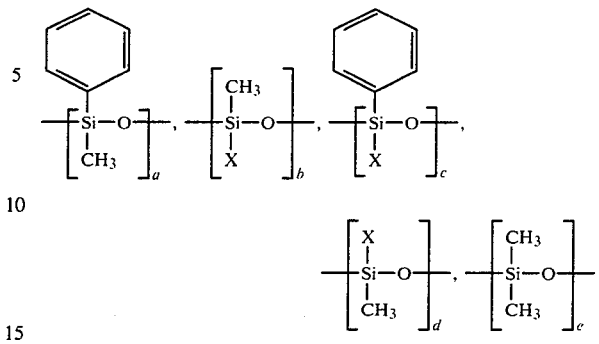

wherein
X is a functional group which allows cross linking at its site and
a, b, c, d, e, are of a magnitude and proportions which provide the resin with a degree of substitution, measured as the ratio of phenyl plus methyl groups to silicon atoms, of at least about one and a ratio of phenyl groups to silicon atoms of at least about 0.3, and which has a silanol content above 4%, based on the weight of the precondensate.

11. The fast curing resin coating composition of claim 10, wherein the curing agent for said polysiloxane resin system is a multifunctional amine catalyst.

12. The fast curing resin coating composition of claim 1, wherein said curing agent for said polysiloxane resin system is a tin, zinc or iron salt of an organic acid.

13. The fast curing resin coating composition of claim 12, wherein said organic acid is an octoate or a naphthenate.

14. The fast curing resin coating composition of claim 1, wherein the curing agent for said polysiloxane resin system is dibutyltin dilaurate.

15. The fast curing resin coating composition of claim 1, wherein the composition has a viscosity in the range of from about 115 to about 125 seconds, #4 Ford cup, at 25° C.

16. The fast curing resin coating composition of claim 1, wherein essentially all of said epoxy resin has a molecular weight in the range of from about 50,000 to about 200,000.

17. The fast curing resin coating composition of claim 1, wherein said epoxy resin is present in the range of from about 15% to about 20%.

18. The fast curing resin coating composition of claim 1, wherein said suitable solvents include isophorone and butyl cellosolve.

19. The fast curing resin coating composition of claim 1, and further including a surface tension modifier to control foaming and surface defects in the coating.

* * * * *